Patented Jan. 1, 1935

1,986,051

UNITED STATES PATENT OFFICE 1,986,051

GUM

Taliaferro J. Fairley, Alexandria, La., assignor, by direct and mesne assignments, of one-half to W. J. Hunter and one-half to Mary P. Hunter, both of Shreveport, La.

No Drawing. Application July 6, 1931, Serial No. 549,119

4 Claims. (Cl. 134—17)

The present invention relates to the manufacture of a varnish gum, comprising a product obtained by treating the distillate or oil which is the subject matter of an application executed by me this day, and entitled Process of treating rubber, filed July 6, 1931, Serial No. 549,118.

The distillate employed comprises the fractions obtained by distilling vulcanized rubber to substantial dryness or up to a temperature of about 400° C., condensing all of the resultant vapors, and collecting the various fractions as a single distillate, or the distillate may comprise those fractions obtained by distilling vulcanized rubber to substantial dryness in a vacuum using lower temperatures. In each case, the fractions are condensed and collected as a single distillate.

By a varnish gum, I mean the gum generally understood by this term in varnish manufacture with which is usually added an oil, a drier, a thinner, and a pigment.

In preparing my improved gum, I mix with the distillate or oil obtained as described above or in accordance with my aforesaid application, a dilute solution of nitric acid. The mass is heated and agitated until reaction takes place, which will generally be indicated by violent foaming. In referring to dilute nitric acid, I mean a substantially 50% solution which of course may be varied if required. The quantity of acid solution employed will vary from possibly 10 to 25% by volume, with respect to the oil. When violent foaming is observed, the heating and agitation is discontinued and the mass cooled. For this purpose, the reaction is carried out in a jacketed vessel so that the cooling may be accomplished by passing a cooling fluid about the wall containing the reaction product. In most cases the agitation will be continued during the cooling operation to assure a more rapid cooling.

It will be understood that the agitation during the reaction period is resorted to, to prevent any possibility of burning.

The resultant product after the cooling operation is a heavy viscous material, and resembles a soft varnish gum.

It is possible that some water will remain in the gum, and this can be drawn off from the reaction vessel and thereafter in order to completely dry the gum, it can be placed in a suitable oven or vacuum drier to completely remove any traces of moisture.

The final product can be thinned with my aforesaid oil or distillate, and the solution so obtained can be mixed with a suitable drier, pigment and thinner. For driers I may use the oxides of cobalt, manganese or lead, and as a thinner, I may use turpentine or the well known mineral oil distillate boiling between gasolene and kerosene.

It appears that the distillate or oil subjected to the treatment which I have outlined above is polymerized, and as stated, I have found the polymerized gum to be superior to the so-called varnish gums which are now in commercial use for varnish making.

The gum which is the product of my invention will be resistant to the action of acids, alkalies, and wholly insoluble in water. When incorporated with my distillate which of itself is a drying oil, the solution will be likewise resistant to acids, alkalies, alcohol, and waterproof. Moreover, both the gum and the solution formed by incorporating it with my distillate will be resistant to heat and coldness, so that a varnish prepared with these materials will withstand to much greater degree, the various conditions under which varnishes are used.

Thus a varnish having these materials incorporated therein will be resistant to hot and cold water as well as acids, alkalies and alcohol.

While I have referred to nitric acid, I may use other acids to promote the polymerization as for example, organic acids as well as other of the inorganic acids.

I claim:

1. The process of preparing a varnish gum which comprises subjecting vulcanized rubber to destructive distillation up to about 400° C., continuing the distillation until a dry residue is obtained, collecting the resulting mixture of vapors as a single distillate, heating the said distillate in contact with nitric acid, and cooling the reaction product.

2. The process of preparing a varnish gum which comprises subjecting vulcanized rubber to destructive distillation, continuing the distillation until a dry residue is obtained, collecting the resulting mixture of vapors as a single distillate, heating and agitating the said distillate with dilute nitric acid until reaction occurs, and cooling the reaction product.

3. A varnish gum comprising the product resulting from the process of claim 1.

4. A varnish gum comprising the product resulting from the process of claim 2.

TALIAFERRO J. FAIRLEY.